United States Patent
Kim et al.

(10) Patent No.: US 9,226,322 B2
(45) Date of Patent: Dec. 29, 2015

(54) MOBILE COMMUNICATION TERMINAL HAVING EMERGENCY CALL UNIT AND METHOD OF MAKING EMERGENCY CALL USING THE SAME

(71) Applicant: Sekonix Co., Ltd., Dongducheon, Gyeonggi-Do (KR)

(72) Inventors: Seong Soo Kim, Seoul (KR); Soon Chul Choi, Gyeonggi-Do (KR); Jung Hee Hwangbo, Gyeonggi-Do (KR); Won Jong Jee, Gyeonggi-Do (KR)

(73) Assignee: Sekonix Co., Ltd., Dongducheon-Si (KR)

( * ) Notice: Subject to any disclaimer, the term of this patent is extended or adjusted under 35 U.S.C. 154(b) by 250 days.

(21) Appl. No.: 14/063,054

(22) Filed: Oct. 25, 2013

(65) Prior Publication Data

US 2015/0065076 A1 Mar. 5, 2015

(30) Foreign Application Priority Data

Aug. 28, 2013 (KR) ........................ 10-2013-0102405

(51) Int. Cl.
*H04W 76/00* (2009.01)
*H04W 4/22* (2009.01)
*H04W 88/02* (2009.01)

(52) U.S. Cl.
CPC .............. *H04W 76/007* (2013.01); *H04W 4/22* (2013.01); *H04W 88/02* (2013.01)

(58) Field of Classification Search
CPC ...... H04W 76/007; H04W 4/22; H04M 11/04
USPC .................................. 455/404.1, 404.2, 556.1
See application file for complete search history.

(56) References Cited

U.S. PATENT DOCUMENTS

2013/0260826 A1* 10/2013 Nemoto .............. H04M 1/2477
455/556.1
2014/0378191 A1* 12/2014 Hosoi et al. ........ H04W 52/0254
455/575.1

* cited by examiner

*Primary Examiner* — Sharad Rampuria
*Assistant Examiner* — Farideh Madani
(74) *Attorney, Agent, or Firm* — Locke Lord LLP; Christopher J. Capelli; Daniel J. Fiorello

(57) ABSTRACT

The mobile communication terminal includes an emergency call unit that includes a pressure detector detecting a pressure caused by an operation of a user and generates an emergency detection signal when the pressure detector detects a pressure of a predetermined reference value or more; a control unit that generates an emergency call signal when the emergency detection signal is received from the emergency call unit; and a communication unit that receives the emergency call signal from the control unit and transmits the emergency call signal to at least one of a guardian terminal and a management server, wherein the pressure detector includes position pins and an elastic unit located between the position pins and detects a pressure applied to the elastic unit when a pressure of a predetermined reference value or more is applied and the position pins are broken.

11 Claims, 6 Drawing Sheets

MOBILE COMMUNICATION TERMINAL HAVING EMERGENCY CALL UNIT AND METHOD OF MAKING EMERGENCY CALL USING THE SAME

CROSS-REFERENCE TO RELATED APPLICATION

This application claims priority to and the benefit of Korean Patent Application No. 10-2013-0102405 filed in the Korean Intellectual Property Office on Aug. 28, 2013, the entire contents of which are incorporated herein by reference.

BACKGROUND OF THE INVENTION

1. Field of the Invention

The present invention relates, in general, to a mobile communication terminal having an emergency call unit and, more particularly, to a mobile communication terminal to which a pressure of a predetermined reference value or more can be applied and which has an emergency call unit capable of detecting the pressure, so that an emergency call can be quickly and accurately made in an emergency.

2. Description of the Related Art

With the recent remarkable increases in the distribution of wired and wireless Internets and usage thereof, various data communication technologies such as time division multiple access (TDMA), global system for mobile communication (GSM), code division multiple access (CDMA), wideband code division multiple access (W-CDMA), long term evolution (LTE), wireless fidelity (Wi-Fi), and wireless broadband Internet (WiBro) have been developed and commercialized.

With the development of the data communication technologies, functions of communication terminals including mobile phones have drastically expanded to function as a sort of microcomputer in addition to supporting voice calling between users. In particular, mobile communication terminals have been established as necessities of modern people, are carried around by individual users on a daily basis, and have come to be implemented to perform various additional functions such as an electronic wallet and a note pad, in addition to a telephone call function.

Particularly, among communication services provided by wired/wireless telecommunication service providers or government agencies, services by which a request for emergency rescue can be made (for example, SOS public relief service) have recently been released, and thus services in which a user carrying a mobile communication terminal has sent the request for emergency rescue to guardians or relief agencies using the mobile communication terminal when an emergency has arisen have been provided.

However, such services and technologies relating to the services are known to the public. As such, there is a problem in that a user's mobile phone is robbed or damaged by a criminal, and thus the request for emergency rescue becomes impossible when it is actually necessary. Furthermore, methods of operating a mobile phone to request emergency assistance are somewhat complicated, and thus there is a problem with feasibility of such operation methods in real situations.

In order to improve the above-mentioned problems, various research and development has been conducted, and a plurality of documents have been published including Korean Patent No. 10-0827709 (urgent call misappropriation prevention system and method using wireless communications; hereinafter referred to as a "preceding patent").

Reviewing the preceding patent, the urgent call misappropriation prevention system using the mobile communication network includes: a rescue requestor terminal 100 formed with an emergency rescue key 110 for an emergency of a user; a telecommunication service provider server 200 configured to receive information about the emergency from the rescue requestor terminal, to perform a telephone call connection between the rescue requestor terminal and a rescuer terminal, to switch the telephone call connection to a telephone call connection between the rescue requestor terminal and a security server when the emergency information is transferred from the rescuer terminal to the security server, and to transmit information about a telephone number and a short message of a rescue requestor to the rescuer terminal; the rescuer terminal 400 configured to receive the telephone number and short message information of the rescue requestor of the rescue requestor terminal from the wired/wireless telecommunication service provider server and to inform a rescuer of the emergency; and the security server 500 configured to perform a telephone call connection between the rescue requestor terminal and a secondary emergency contact destination (a police station or a fire station) in a one-way reception state through the wired/wireless telecommunication service provider server and to enable the telephone call connection between the rescue requestor terminal and the secondary emergency contact destination.

However, when a mobile communication subscriber cannot directly make a voice call, the subscriber cannot make a request for the emergency rescue based on the preceding patent. It is disclosed in the preceding patent that the emergency rescue key is separately formed. The emergency rescue key has a problem in that a user frequently accidentally activates the emergency rescue function. In addition, when the emergency rescue key is configured in the form of a plurality of buttons, there is a problem in that it is difficult for the user to normally operate the emergency rescue key in the real situations.

DOCUMENTS OF RELATED ART (Patent Document 1) Korean Patent No. 10-0827709 (issued on Apr. 29, 2008)

SUMMARY OF THE INVENTION

Accordingly, the present invention has been made keeping in mind the above problems occurring in the related art, and the present invention is intended to propose a mobile communication terminal having an emergency call unit, in which a user can easily operate the emergency call unit in an emergency and use an emergency call function though a minimal operation such as a touch and a pressure gesture without confusion.

In addition, the present invention is intended to propose a mobile communication terminal having an emergency call unit, in which the emergency call unit can provide an easy operation and a separate operation in the event of an emergency call so as to prevent a user from accidentally operating the emergency call unit in daily life or in unwanted situations.

In order to solve the above-mentioned problems in the related art, according to one aspect of the present invention, a mobile communication terminal according to an embodiment of the present is intended to propose a mobile communication terminal including: the emergency call unit that includes a pressure detector detecting a pressure caused by an operation of a user and generates an emergency detection signal when the pressure detector detects a pressure of a predetermined reference value or more; a control unit that generates an emergency call signal when the emergency detection signal is received from the emergency call unit; and a communication unit that receives the emergency call signal from the control unit and transmits the emergency call signal to at least one of a guardian terminal and a management server, wherein the pressure detector includes position pins and an elastic unit located between the position pins and detects a pressure applied to the elastic unit when a pressure of a predetermined reference value or more is applied and the position pins are broken.

According to second aspect of the present invention, a method of making an emergency call using a mobile communication terminal is intended to propose a method of making an emergency call using a mobile communication terminal including: detecting a pressure applied to a pressure detector by an operation of a user; generating an emergency detection signal when a pressure of a predetermined reference value or more is detected and transmitting the emergency detection signal to a control unit; generating an emergency call signal when the control unit receives the emergency detection signal and transmitting the emergency call signal to a communication unit; and transmitting, by the communication unit receiving the emergency call signal, the emergency call signal to at least one of a management server and a guardian terminal, wherein the detecting of the pressure includes breaking position pins under the pressure of the predetermined reference value or more, and detecting a pressure applied when breaking the position pins while applying the pressure to an elastic unit positioned between the position pins.

A mobile communication terminal according to the present invention is integrated with the existing configuration or formed as an emergency call unit which does not protrude from the surface of the mobile communication terminal without largely modifying the existing mobile communication terminal. Thereby, there is an effect in which, when the user operates the terminal at a normal time, it is possible to minimize cases in which the user unintentionally operates the emergency call unit, and achieves reduction of manufacturing cost and ease of production.

Furthermore, since the operation can be very easily and conveniently performed in an actual emergency by operating the emergency call unit using touch and pressure by the user, there is an advantage in that actual feasibility in the case of an emergency call is increased.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
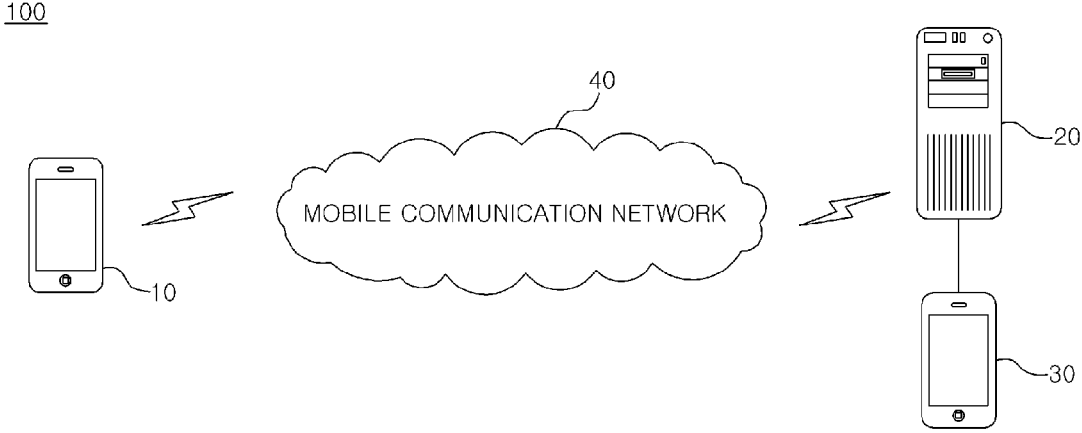
FIG. 1 is a block diagram illustrating a system in which a mobile communication terminal having an emergency call unit according to an embodiment of the present invention operates.

Hereinafter, in numerous drawing, the same reference numeral indicates the same component.

Hereinafter, embodiments of the present invention will be described in detail with reference to the accompanying drawings. It should be note that when reference numerals are given to components in each drawing, the same elements will be designated by the same reference numerals as possible although they are shown in different drawings. Further, in the description of embodiments of the present invention, a detailed description of known configurations or functions incorporated herein will be omitted when it may make the subject matter of the present invention rather unclear. Throughout the specification, when a certain portion "includes" a certain component, this indicates that the other components are not excluded, and may be further included unless otherwise noted.

FIG. 1 is a block diagram illustrating a system 100 in which a mobile communication terminal having an emergency call unit according to an embodiment of the present invention operates. A mobile communication terminal 10 according to the present invention may transmit an emergency call signal to a management server 20 and a guardian terminal 30 through a mobile communication network 40.

The mobile communication terminal 10 refers to a portable terminal that is carried by a user and is capable of using a wired or wireless network, and a terminal that is mounted with hardware and software for implementing an emergency call function of the present invention. The mobile communication terminal 10 of the present invention can be implemented to output the emergency call signal in such a manner that, when detecting and transmitting the emergency call signal, a message for short message service (SMS) is used or a separate application is driven. Components included in the mobile communication terminal 10 to implement the emergency call function will be described in greater detail with reference to FIG. 2.

When the emergency call signal (for example, an emergency message including a position and a telephone number) is generated from the mobile communication terminal 10 by the operation of the user, the emergency call signal is transmitted to the management server 20 and/or the guardian terminal 30 through the mobile communication network 40. The mobile communication terminal 10 may be implemented as various mobile devices such as computing devices, for example, personal digital assistants (PDAs), cellular phones, smart phones, and tablet personal computers (PCs). Communication of the mobile communication terminal may be implemented as digital data communication through any form or medium (for example, communication network). An example of the communication network includes a local area network (LAN), a wide area network (WAN), and the Internet.

The management server 20 may be a server of an organization which provides services related to the emergency call, for example a server of a wired/wireless telecommunication service provider or a local management server. The guardian terminal 30 may be implemented as various digital computers such as a laptop computer, a desktop computer, and a workstation as well as various mobile devices such as the computing devices, for example, a PDA, a cellular phone, a smart phone, and a tablet PC.

Figure 2:
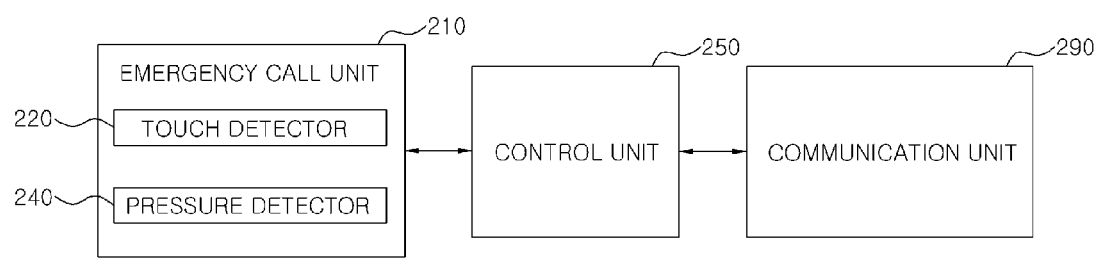
FIG. 2 is a block diagram illustrating a configuration of the mobile communication terminal having the emergency call unit according to the embodiment of the present invention.

FIG. 2 is a block diagram illustrating a configuration of the mobile communication terminal 10 having the emergency call unit according to the embodiment of the present invention. The mobile communication terminal 10 of the present invention includes an emergency call unit 210 configured to detect an operation of a user, a control unit 250 configured to generate the emergency call signal, and a communication unit 290 configured to communicate with the outside of the terminal. The emergency call unit 210 may include a touch detector 220 and a pressure detector 240. It is apparent that the mobile communication terminal 10 of the present invention may include a processor, memory, an input/output device (for example, a touchable display screen), and a communication interface, in addition to the components illustrated in the drawings.

The emergency call unit 210 detects touch and pressure caused by the operation of the user to generate the emergency detection signal, and transmits the generated emergency detection signal to the control unit 250. For example, the emergency call unit of the present invention may detect the touch or the pressure, or both the touch and the pressure.

When the emergency call unit of the present invention detects both the touch and the pressure, the touch detector 220 can detect the touch of the user according to an electrostatic scheme. When the touch exceeds a time preset in the event of a design, the touch detector 220 can detect the touch as a touch signal. It is intended to avoid a malfunction of the device by preventing an involuntary touch or accidental touch of a finger at a normal time from being detected as a touch signal. For example, the touch detector 220 may be provided on a camera or a home key installed on the mobile communication terminal 10. When the emergency call unit 210 is integrated with the home key, the touch detector 220 may be implemented in such a manner that it is provided at an upper portion of the camera or surrounds the camera, or is provided at an upper portion of the home key.

As described above, the touch is detected by the touch detector 220. However, an embodiment in which only a predetermined pressure is detected to operate the emergency call unit will be mainly described. However, the embodiment is not limited thereto.

The pressure detector 240 detects a change in the pressure applied by the operation of the user. In other words, the pressure detector 240 is adapted to detect a pressure signal generated when the user intentionally touches and presses the emergency call unit 210. In this way, the emergency call is made by the simple operation, and thereby practicality and ease of emergency call function are reinforced.

When a pressure of a predetermined reference value or more which is set in design is applied to the pressure detector 240, the pressure detector 240 may be implemented to detect that the pressure required for the emergency call is applied (the pressure is recognized as a specific pressure signal). In other words, when the applied pressure is not the pressure of the predetermined reference value or more, this can be recognized as not being an emergency. Determining whether the applied pressure is equal to or greater than a predetermined pressure will be apparent from the description of the detailed structure of the pressure detector 240 with reference to FIG. 3A to 4.

Detection conditions set for the pressure detector 240 may include pressing the pressure detector 240 with the predetermined pressure or more as well as pressing the pressure detector 240 for the predetermined time or more. When the applied time of the pressure exceeds a time preset in design, the pressure may be detected as a pressure signal. This is intended to operate the emergency call function only when the user intentionally presses the press detector 240 for the preset time even when the user mistakenly presses the pressure detector 240 at a normal time.

As another example, the number of touches or pushes may be set as the detection condition for the touch detector 220 and the pressure detector 240, in addition to the preset time and pressure. Other emergency detection signals may be implemented to be generated according to the number of pushes (for example, once for violence, and twice for kidnapping, etc.).

For example, the pressure detector 240 may be implemented to be installed on the bottom of the camera or the home key. The pressure detector 240 may be integrated with another component or be installed on the bottom of a separate recessed area. In addition, although not shown in the drawings, the pressure detector 240 may further include the pressure sensor described in FIG. 4.

When the emergency call unit 210 detects the pressure of the predetermined reference value or more, the emergency call unit 210 generates an emergency detection signal and transmits the emergency detection signal to the control unit 250. In this case, the control unit 250 may receive the emergency detection signal to generate an emergency call signal to be transmitted to the outside, and transmit the generated emergency call signal to the communication unit 290. The emergency call signal generated to be transmitted to the outside by the control unit 250 may be information reprocessed so as to include a current location and time, or information generated so as to include additional content such as a telephone number and a picture. The emergency call signal may be generated in the form of an SMS message as an example, or be data generated through a separate emergency call application as another example. Such an emergency call signal may be implemented in such a manner that the emergency call signal is generated in real time when the control unit 250 receives the emergency detection signal, or transmitted as soon as the emergency detection signal is input after the emergency call signal is generated in advance.

When the communication unit 290 receives the emergency call signal from the control unit 250, the communication unit 290 transmits the emergency call signal to the management server 20 and/or the guardian terminal 30. Alternatively, the communication 290 may be implemented so as to transmit the emergency call signal only to one of the management server 20 and the guardian terminal 30, or to servers of other agencies (for example, a police station and a fire station) in addition to the management server 20 and the guardian terminal 30, according to the setting of a user or a designer.

In this way, the mobile communication terminal 10 equipped with the emergency call unit 210 is implemented so as to generate the emergency detection signal from the emergency call unit 210 having the touch detector 220 and/or the pressure detector 240 only when the predetermined conditions are met. Thereby, the mobile communication terminal 10 is improved such that the accidental operation caused by a mistake at a normal time is not perceived as the emergency. Even when the mobile communication terminal is not equipped with a separate button, the emergency call unit 210 is implemented so as to integrate the pressure detector with the camera or the home key installed on the existing terminal. Thereby, it is possible to further reduce manufacturing cost and improve ease of production. The terminal may be implemented in such a manner that the emergency call unit does not interfere with the ordinary operation when used at a normal time in the user's place.

Figure 3A:
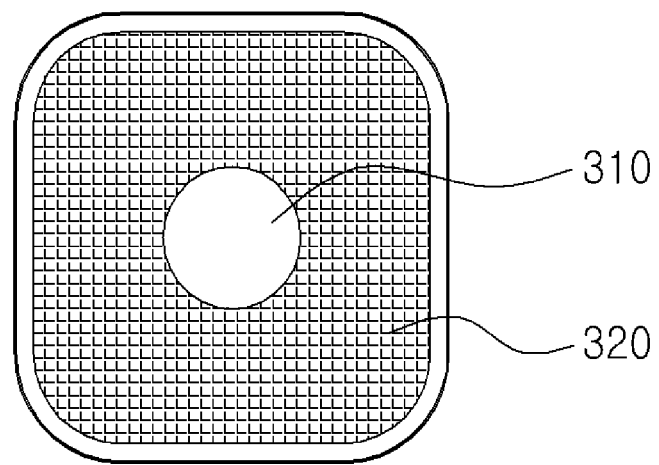
FIGS. 3A to 3C are diagrams illustrating a detailed configuration of the emergency call unit of the mobile communication terminal according to the embodiment of the present invention.
Figure 3B:
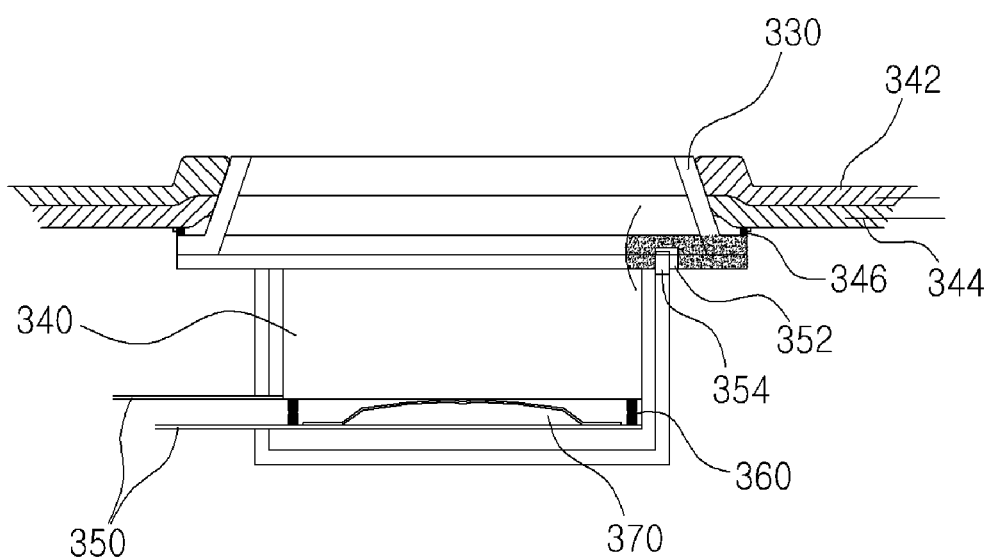
Figure 3C:
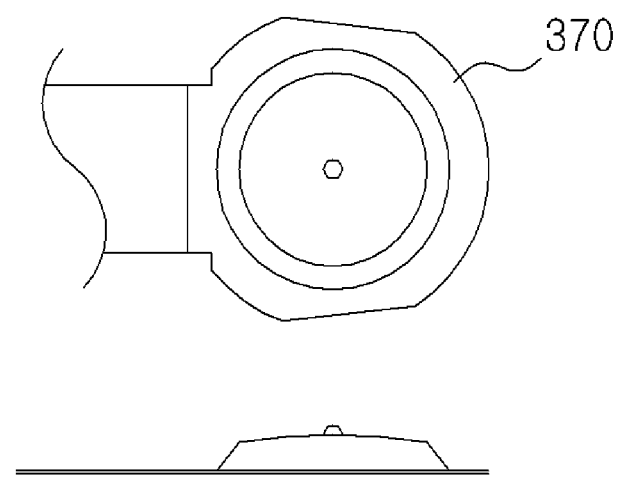

FIGS. 3A to 3C are diagrams illustrating the emergency call unit 210 of the mobile communication terminal according to the embodiment of the present invention. FIG. 3A is a diagram illustrating an external appearance of the emergency call unit 210, FIG. 3B is a diagram illustrating the detailed configuration of the emergency call unit 210, and FIG. 3C is a diagram illustrating a configuration of an elastic unit of the pressure detector 240.

First, referring to FIG. 3A, when the emergency call unit is integrated with the camera, the emergency call unit 210 of the present invention may include a camera 310 disposed at the center thereof and a frame 320 covering the edge of the emergency call unit, and configured such that the pressure detector is located on the bottom of the camera 310. For example, when the emergency call unit 210 includes the touch detector, the emergency call unit may be implemented so as to be provided at an upper portion of the camera 310 or to use (integrate with) the camera 310, and be made up of camera frame and cover at the periphery thereof.

FIG. 3B is a diagram illustrating the detailed configuration of the emergency call unit 210. When integrated with the camera, the emergency call unit will be described with reference to FIG. 3B. However, the embodiment is not limited to the case in which the emergency call unit 210 is integrated with the camera. The emergency call unit may be integrated with any component of the mobile communication terminal 10, such as a home key, a front camera, a rear camera, or a menu key, and be implemented as a separate component. Even when the emergency call unit is implemented as the separate component, the emergency call unit 210 of the present invention may be formed in intaglio so as not protrude from the surface of the mobile communication terminal in order to prevent a malfunction during the ordinary operation of the user.

When the emergency call unit 210 is integrated with the camera, the emergency call unit 210 of the present invention includes a camera frame 330 and back covers 342 and 344, similarly to the configuration of the existing camera, and includes a gasket cushion 346 for preventing an inflow of a liquid, a guide hole 352, and a guide pin 354. A camera module 340 required to operate the camera may be provided below the emergency call unit 210.

The pressure detector 240 may be disposed on the bottom of the camera, and be implemented so as to divide from the camera module 340 by forming a boundary with the camera module 340 using insulating substrates 350 (for example, flexible printed circuit boards (FPCBs)). In this case, as the insulating substrates 350, flexible insulating substrates may be used so as to be pressurized downward under pressure. As shown in the drawing, the pressure detector 240 may be implemented in such a manner that the insulating substrates 350 are supported in-between by position pins 360 at a normal time, and when the applied pressure is lower than the predetermined value, the pressure is not applied to an elastic unit (for example, a dome type spring) 370. In this case, the number of position pins may be 2 or more as shown in the drawing, and the elastic unit 370 may be implemented in various forms. In other words, the elastic unit 370 may be provided in a deformable form in such a manner that, when the pressure is applied, the position pins 360 are broken to apply the pressure to the elastic unit. FIG. 3B illustrates the elastic unit 370 such as a dome type spring as an example. The position pins 360 function to prevent the emergency call unit 210 from being operated during ordinary operation (that is, when the pressure of the predetermined value or more is not applied), whereas the position pins 360 are broken and function to transmit the pressure based on a simple criteria in an emergency. The position pins 360 have an easy structure in terms of the design and manufacturing.

When the user intentionally applies the pressure of the predetermined value or more to the emergency call unit 210 in an emergency, the position pins 360 are broken, and the insulating substrates 350 and the elastic unit 370 are pressed. Thereby, the applied pressure is detected. The pressure detector 240 may be implemented in such a manner that, when such a pressure detection time exceeds a predetermined time, the pressure is recognized as the pressure signal.

In this way, the emergency call unit 210 according to the present invention is implemented in such a manner that the pressure is not transmitted to the elastic unit 370 using the position pins 360 at a normal time, and thereby there is an advantage in that the emergency call unit 210 is safe from the malfunction use at a normal time and is operated only in an emergency.

FIG. 3C is a diagram illustrating in detail the elastic unit 370 of the present invention. As shown, the elastic unit 370 has a circular spring shape in which a lower side thereof is wider than an upper side thereof when viewed from the top and a shape pressed downward when the pressure is applied when viewed from the front. Since such an elastic unit 370 is supported by the widely formed lower side, when the pressure is applied to the central portion of the elastic unit 370, the pressure can be detected with no deformation of the spring.

The emergency call unit 210 integrated with the camera has been mainly described with reference to FIGS. 3A to 3C. However, as described above, the emergency call unit 210 may be integrated with the home key of the mobile communication terminal (for example, a home key disposed on the front lower portion of a smart phone).

Figure 4:
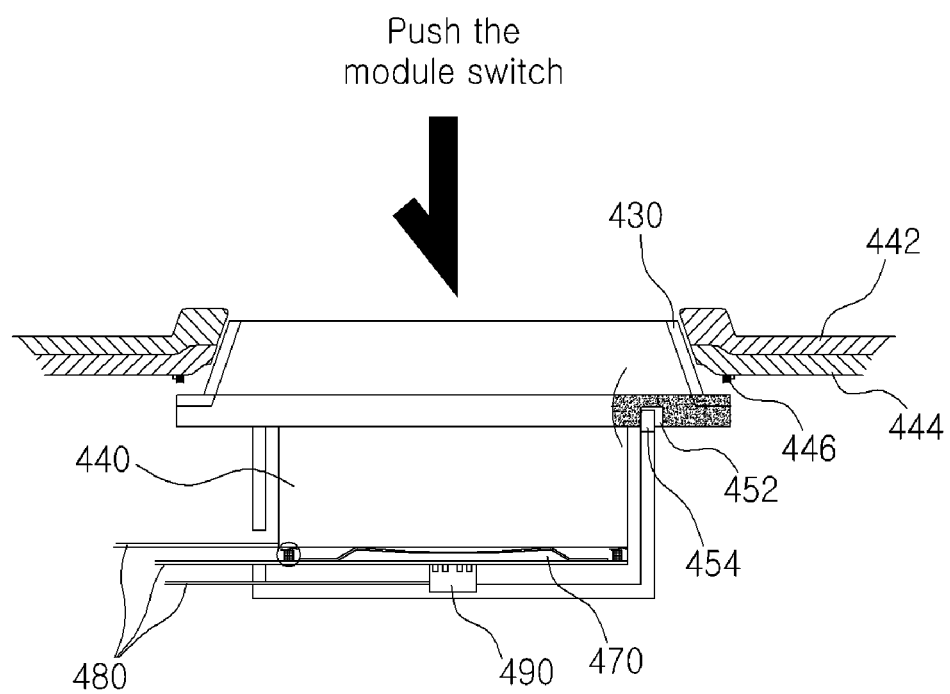
FIG. 4 is a diagram illustrating an emergency call unit for a mobile communication terminal according to another embodiment of the present invention.

FIG. 4 is a diagram illustrating an emergency call unit 210 of a mobile communication terminal according to another embodiment of the present invention. It is characterized that the emergency call unit 210 illustrated in FIG. 4 further includes a pressure sensor on the bottom of an elastic unit 470←370. As in FIGS. 3A to 3C, the emergency call unit integrated with a camera will be described. However, the embodiment is not limited to the case in which the emergency call unit is integrated with the camera. The emergency call unit may be integrated with any component of the mobile communication terminal 10 such as a home key, a front camera, a rear camera, or a menu key, and be implemented as a separate component.

When the emergency call unit 210 is integrated with the camera, the emergency call unit 210 includes a camera frame 430 and back covers 442 and 444, similarly to the configuration of the existing camera, and includes a gasket cushion 446 for preventing an inflow of a liquid, a guide hole 452, and a guide pin 454. A camera module 440 required to operate the camera may be provided below the emergency call unit 210.

The pressure detector 240 may be disposed on the bottom of the camera, and be implemented so as to be divided from the camera module 440 by forming a boundary with the camera module 440 using insulating substrates 480 (for example, FPCBs). In this case, as the insulating substrates 480, flexible insulating substrates may be used so that the pressure can be applied downward according to the applied pressure. As shown, the pressure detector 240 may be implemented in such a manner that the insulating substrates 480 are supported in-between by position pins at a normal time, and when the applied pressure is lower than a predetermined value, the pressure is not applied to the elastic unit 470.

When the user intentionally applies the pressure of the predetermined value or more to the emergency call unit 210 in an emergency, the position pins are broken and the insulating substrates 480 and the elastic unit 470 are pressed. Thereby, the applied pressure is detected. The pressure detector 240 may be implemented in such a manner that, when such a pressure detection time is a predetermined time or more, the pressure is recognized as a pressure signal.

Unlike the embodiment of FIGS. 3A to 3C, in the embodiment, a pressure sensor 490 is further provided on the bottom of a dome type spring. The pressure sensor 490 may be designed to start the operation thereof when the pressure is applied to the elastic unit 470, and detect the pressure as the pressure signal when a time required to apply the pressure exceeds a preset time (for example, 5 minutes). Like the elastic unit 470, the pressure sensor 490 may also be supported by the position pins at a normal time and be maintained so that the pressure is not applied thereto. As the emergency call unit 210 has the pressure sensor 490, the emergency call unit 210 can minutely detect pressure intensity and the applied time of the pressure.

In this way, the mobile communication terminal 10 according to the present invention is equipped with the emergency call unit that is integrated with the existing configuration or does not protrude from the surface of the mobile communication terminal without great deformation of an existing mobile communication terminal. Thereby, when the user operates the terminal normally, the user can minimize the unintentional operation of the emergency call unit, and it is possible to achieve a reduction in manufacturing cost and simplify production. Furthermore, as the user operates the emergency call unit using touch and pressure, the emergency call unit is very easily and conveniently operated in real situations. As such, there is an advantage in that practicability is substantially is increased in the emergency call.

In the above description, since only the above-mentioned specific examples have been described in detail in order to facilitate the understanding of the present invention, the components, the connections and relationships thereof, and the functions thereof described in the specification are only exemplary in meaning. In the present invention, although the emergency call unit 210, the touch detector 220, the pressure detector 240, the control unit 250, and the communication unit 290, which are included in the mobile communication terminal 10, are implemented in such a manner that they are physically integrated with one another, these components may be implemented in a physically separated form or an integrated form in which two or more components are integrated, as needed.

Although it has been described that all components configuring those described in the embodiments of the present invention are combined into one or operated in a combined state, the present invention is not necessarily limited to such embodiments. In other words, as long as it is within the scope of the object of the present invention, all the components may be operated in a state in which one or more of components are optionally combined.

Further, it will be understood that, throughout the specification, unless explicitly stated to the contrary, the term "comprise" and its conjugations such as "comprises" and "comprising" should be interpreted as including any stated elements but not necessarily excluding other elements. Unless otherwise defined, all terms used herein, including technical or scientific terms, have the same meanings as those generally understood by those with ordinary knowledge in the field of art to which the invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

The above description is merely intended to illustratively describe the technical spirit of the present invention, and various changes and modifications can be made by those skilled in the art without departing from the essential features of the present invention. Therefore, the embodiments disclosed in the present invention are not intended to limit the technical spirit of the present invention, but are intended to describe the present invention. The scope of the spirit of the invention is not limited by these embodiments. The scope of the present invention should be defined by the accompanying claims and all technical spirits falling within the equivalent scope thereof should be interpreted as being included in the scope of the present invention.

What is claimed is:

1. A mobile communication terminal having an emergency call unit, the mobile communication terminal comprising:
    the emergency call unit that includes a pressure detector detecting a pressure caused by an operation of a user and generates an emergency detection signal when the pressure detector detects a pressure of a predetermined reference value or more;
    a control unit that generates an emergency call signal when the emergency detection signal is received from the emergency call unit; and
    a communication unit that receives the emergency call signal from the control unit and transmits the emergency call signal to at least one of a guardian terminal and a management server,
    wherein the pressure detector includes position pins and an elastic unit located between the position pins and detects the pressure applied to the elastic unit when the pressure of a predetermined reference value or more is applied and the position pins are broken,
    wherein the pressure detector further includes a pressure sensor that is located below the elastic unit and detects the pressure applied to the elastic unit, wherein the pressure sensor starts an operation when the pressure of the predetermined reference value or more is applied to the elastic unit and detects, as a pressure signal, the pressure applied when the applied time of the pressure exceeds a preset time.

2. The terminal according to claim 1, wherein the position pins are supported at both sides of the elastic unit such that the pressure is not applied to the elastic unit before the position pins are broken.

3. The terminal according to claim 1, wherein the emergency call unit is formed in a recessed form so as not to protrude from a surface of the mobile communication terminal.

4. The terminal according to claim 1, wherein the emergency call unit is integrated with a camera of the mobile communication terminal, and
    the pressure detector is provided on the bottom of the camera.

5. The terminal according to claim 1, wherein the emergency call unit is integrated with a home key of the mobile communication terminal, and
    the pressure detector is provided on the bottom of the camera.

6. The terminal according to claim 1, wherein the elastic unit is a dome type spring.

7. The terminal according to claim 1, wherein the number of position pins is at least two.

8. A method of making an emergency call using a mobile communication terminal, the method comprising:
    detecting a pressure applied to a pressure detector by an operation of a user;
    generating an emergency detection signal when a pressure of a predetermined reference value or more is detected and transmitting the emergency detection signal to a control unit;

generating an emergency call signal when the control unit receives the emergency detection signal and transmitting the emergency call signal to a communication unit; and transmitting, by the communication unit receiving the emergency call signal, the emergency call signal to at least one of a management server and a guardian terminal, wherein the detecting of the pressure includes breaking position pins under the pressure of the predetermined reference value or more, and detecting the pressure applied when breaking the position pins while applying the pressure to an elastic unit positioned between the position pins, wherein the detecting of the pressure applied to the elastic unit includes detecting the pressure using a pressure sensor located below the elastic unit, wherein the pressure sensor starts an operation when the pressure of the predetermined reference value or more is applied to the elastic unit and detects, as a pressure signal, the pressure applied when the applied time of the pressure exceeds a preset time.

9. The method according to claim 8, wherein the position pins are supported at both sides of the elastic unit such that the pressure is not applied to the elastic unit before the position pins are broken.

10. The method according to claim 8, wherein the elastic unit is a dome type spring.

11. The method according to claim 8, the number of position pins is at least two.

* * * * *